(12) United States Patent
Yang et al.

(10) Patent No.: US 8,618,773 B2
(45) Date of Patent: Dec. 31, 2013

(54) BATTERY PACK AND CHARGING CONTROL METHOD THEREOF

(75) Inventors: Jongwoon Yang, Suwon-si (KR);
Susumu Segawa, Suwon-si (KR);
Tetsuya Okada, Suwon-si (KR); Inkyu Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 592 days.

(21) Appl. No.: 12/881,094

(22) Filed: Sep. 13, 2010

(65) Prior Publication Data

US 2011/0084662 A1 Apr. 14, 2011

(30) Foreign Application Priority Data

Oct. 12, 2009 (KR) .................. 10-2009-0096630

(51) Int. Cl.
*H02J 7/00* (2006.01)
(52) U.S. Cl.
USPC ........... 320/132; 320/127; 320/128; 320/134; 320/136; 320/137
(58) Field of Classification Search
CPC .................................. Y02E 60/12
USPC ........................................... 320/132
See application file for complete search history.

(56) References Cited

U.S. PATENT DOCUMENTS

| | | |
|---|---|---|
| 5,523,670 A | 6/1996 | Ninomiya |
| 5,576,608 A | 11/1996 | Nagai et al. |
| 7,339,354 B2 | 3/2008 | Sanpei |
| 2005/0200331 A1* | 9/2005 | Patino et al. .................. 320/128 |
| 2010/0123438 A1 | 5/2010 | Harada |

FOREIGN PATENT DOCUMENTS

| | | | |
|---|---|---|---|
| EP | 1 065 773 A2 | 1/2001 | |
| EP | 2249456 A1 | 11/2010 | |
| JP | 04-178122 | 6/1992 | |
| JP | 06-325794 | 11/1994 | |
| JP | 2003-219570 | 7/2003 | |
| JP | 2003-229180 | 8/2003 | |
| JP | 2009-112194 | 5/2009 | |
| JP | 2009112194 A * | 5/2009 | ............... B60L 3/00 |
| KR | 10-1994-0004911 | 3/1994 | |
| KR | 10-0153438 B1 | 7/1998 | |
| KR | 10-2004-0032415 | 4/2004 | |
| KR | 10-2007-0038762 | 4/2007 | |
| WO | WO 2009/110221 A1 | 9/2009 | |

OTHER PUBLICATIONS

European Search Report dated Dec. 28, 2010, for corresponding European Patent application 10187281.0.
KIPO Office action dated Feb. 16, 2011, for Korean priority Patent application 10-2009-0096630.

(Continued)

*Primary Examiner* — Edward Tso
*Assistant Examiner* — Ahmed Omar
(74) *Attorney, Agent, or Firm* — Christie, Parker & Hale, LLP

(57) ABSTRACT

A charging control method for a battery pack including a plurality of battery cells in which a full charge voltage value is initially set as a first voltage value. The charging control method includes: charging the plurality of battery cells to the first voltage value in an initial charge mode; and resetting the full charge voltage value to a second voltage value less than the first voltage value in a subsequent charge mode.

18 Claims, 5 Drawing Sheets

(56) References Cited

OTHER PUBLICATIONS

Japanese Office action dated Jul. 3, 2012 issued to corresponding Japanese patent application No. 2010-213767, 2 pages.

European Office Action dated Aug. 21, 2012 of the corresponding European Patent Application No. 10187281.0.
Korean Notice of Allowance dated Oct. 25, 2011 issued to Korean Priority Patent Application KR 10-2009-0096630, 5 pages.

* cited by examiner

BATTERY PACK AND CHARGING CONTROL METHOD THEREOF

CROSS-REFERENCE TO RELATED APPLICATION

This application claims priority to and the benefit of Korean Patent Application No. 2009-0096630, filed on Oct. 12, 2009, in the Korean Intellectual Property Office, the entire content of which is incorporated herein by reference.

BACKGROUND

1. Field

One or more embodiments of the present invention relate to a charging control method for a battery pack.

2. Description of the Related Art

Generally, battery packs are mounted on portable electronic equipment, such as notebook computers, Personal Digital Assistants (PDA) and camcorders, and are thereby used to power these devices.

Particularly, notebook computers require a large-capacity battery pack because they consume a large amount of power. For enlarging the capacity of the battery pack, methods for enlarging the capacity of a battery cell itself and methods that connect a plurality of battery cells having the same capacity in parallel are used. However, because the former increases the size of the battery cell itself and the latter uses a plurality of battery cells, the size of the battery pack increases.

Accordingly, some users connect an adapter to portable electronic equipment, particularly, an electronic device such as a notebook computer, to continuously supply power to the electronic device.

SUMMARY

Embodiments of the present invention are directed to a charging control method for a battery pack, which decreases the deterioration of a battery cell, thereby increasing the stability of the battery cell.

An embodiment of the present invention provides a charging control method for a battery pack, which includes a plurality of battery cells in which a full charge voltage value is initially set as a first voltage value, including: charging the plurality of battery cells to the first voltage value in an initial charge mode; and resetting the full charge voltage value to a second voltage value less than the first voltage value in a subsequent charge mode.

The resetting the full charge voltage value may include: measuring a charge capacity of any one of the battery cells several times for a duration after the initial charge mode; storing a number of measurement times in which the measured charge capacity is equal to or higher than 90% of a rated capacity of the battery cell as first data, and storing a number of measurement times in which the measured charge capacity is less than 90% of the rated capacity of the battery cell as second data; comparing the first data and the second data; and decreasing the full charge voltage value from the first voltage value to the second voltage value when the first data is greater than the second data. The measuring of the charge capacity may be performed when an external system coupled to the battery pack is being used in an Alternating Current (AC) mode.

In the charging control method, the plurality of battery cells may be charged with the second voltage value from the subsequent charge mode.

An embodiment of the present invention provides a charging control method for a battery pack, which includes a plurality of battery cells in which a full charge capacity value is initially set as a first capacity value, including: charging the plurality of battery cells to the first capacity value in an initial charge mode; and resetting the full charge capacity value to a second capacity value less than the first capacity value in a subsequent charge mode.

The resetting the full charge capacity value may include: measuring a charge capacity of any one of the battery cells several times for a duration after the initial charge mode; storing a number of measurement times in which the measured charge capacity is equal to or higher than 90% of a rated capacities of the battery cells as first data, and storing a number of measurement times in which the measured charge capacity is less than 90% of the rated capacities of the battery cells as second data; comparing the first data and the second data; and decreasing the full charge capacity value from the first capacity value to the second capacity value when the first data is greater than the second data.

In the charging control method, the plurality of battery cells may be charged with the second voltage value from the subsequent charge mode.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
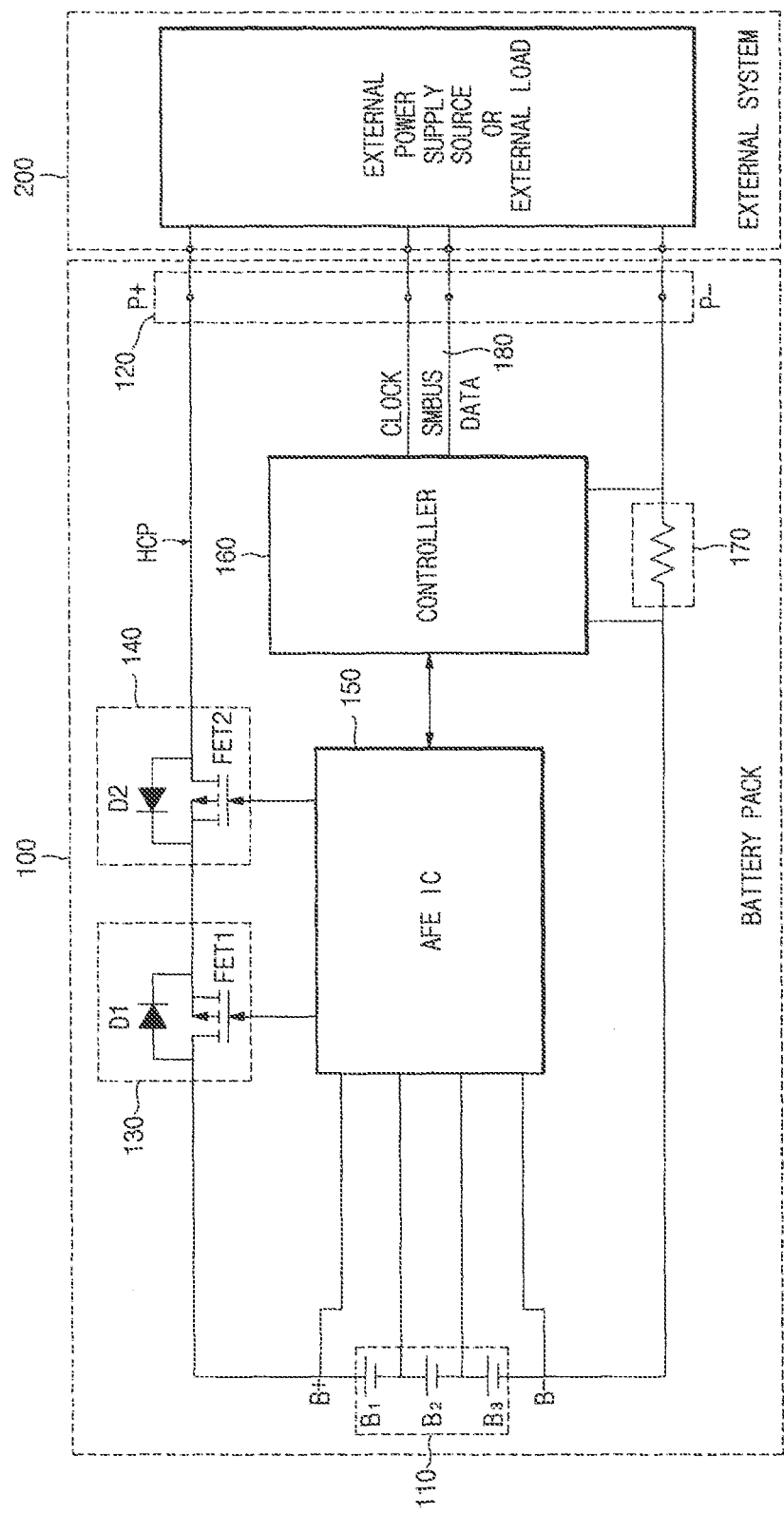
FIG. 1 is a schematic circuit diagram illustrating a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, embodiments of the present invention will be described in detail with reference to the accompanying drawings.

FIG. 1 is a schematic circuit diagram illustrating a battery pack according to an embodiment of the present invention.

Referring to FIG. 1, a battery pack 100 where a charging control method according to an embodiment of the present invention is applied includes a plurality of battery cells 110 capable of charging/discharging, and a battery management unit. The battery pack 100 is not limited to a battery pack having the structure of FIG. 1 described below, and may be formed in various structures, in which a charging control method for a battery pack may be applied.

The battery management unit of FIG. 1 includes an external port 120, a charging device 130, a discharging device 140, an Analog Front End (AFE) integrated chip (IC) 150, a controller 160, and a storage 170. The battery management unit may further include a cell balancing circuit that controls the voltages and capacities of the battery cells 110, and an SMBUS 180 between the controller 160 and the external port 120 for communicating with an external system 200. The path between the external port 120 and the battery cells 110 is a high current path HCP, and a charging/discharging current flows in the path.

The battery pack 100 includes the battery cells 110 capable of charging/discharging. For example, the battery cells 110 may be formed as lithium secondary cells. The battery pack 100 is connected (or coupled) to the external system 200 and is charged/discharged through the high current path HCP. The external system 200 may include portable electronic equipment, for example, a portable notebook computer. Moreover, the external system 200 may include an adapter electrically connected (or coupled) to the battery pack 100.

When the battery pack 100 is mounted and used on an external system 200 that is used in an Alternating Current (AC) mode, it can be more effectively applied. Herein, the AC mode denotes a case in which the external system 200 is electrically connected to an AC power supply source and uses the AC power supply source as a power supply source. In this case, the external system 200 receives the AC power supply source as a self-use power, and moreover, operates to charge the battery pack 100. In the AC mode, accordingly, the battery pack 100 does not supply a separate power to the external system 200, and is charged with an external power that is supplied through the external system 200.

Each of the battery cells 110 is configured with a charging/discharging-enabled battery cell, and is formed as a secondary cell, such as a lithium secondary cell. The battery cells 110 are electrically connected (or coupled) to the AFE IC 150. The battery cells 110 output cell-related information, such as the voltage, temperature, charge capacity, and current amount of each battery cell, to the AFE IC 150.

The AFE IC 150 transfers cell-related information, which is provided by the battery cell 110, to the controller 160 and controls the turn-on/off of the charging device 130 and discharging device 140 according to the control of the controller 160.

When voltages between battery cells 110, which are received from the battery cells, are unbalanced, the controller 160 controls a cell balancing circuit that is connected (or coupled) between the battery cells 110 and the AFE IC 150 in series and is directly connected to the controller 160, thereby making voltages between the battery cells 110 equal (or substantially the same).

Hereinafter, the elements of the battery pack 100 and their functions, and the relationship between the battery pack 100 and the external system 200 will be described in more detail.

The battery cells 110 include a plurality of battery cells that are connected (or coupled) in series. For example, the battery cells 110 include a first battery cell B1, a second battery cell B2, and a third battery cell B3 that are connected in series. The number of the battery cells 110 may be changed according to a power capacity that the external system 200 requires, and it is not limited. In FIG. 1, reference signs B+ and B− represent a positive power supply terminal B+ and a negative power supply terminal B− of the battery cells 110 that are connected in series, respectively.

The external port 120 is electrically connected (or coupled) to the battery cells 110, and is located at an end portion of the high current path HCP. Accordingly, the external port 120 electrically connects (or couples) the battery cells 110 and the external system 200 for the charging/discharging operation of the battery cells 110. The external port 120 includes a positive port P+ and a negative port P−. The positive port P+ is connected (or coupled) to the positive power supply terminal B+ of the battery cells 110 through the high current path HCP. Also, the negative port P− is connected to the negative power supply terminal B− of the battery cells 110 through the high current path HCP. Accordingly, the battery cells 110 are electrically connected to the external system 200 through the external port 120 and perform charging/discharging.

The charging device 130 and the discharging device 140 are serially connected on the high current path HCP between the external port 120 and the battery cell 110, and control the charging/discharging of the battery cells 110. Each of the charging device 130 and the discharging device 140 includes a Field Effect Transistor (FET). The FET includes a parasitic diode D. More specifically, the charging device 130 includes a field effect transistor FET1 and a parasitic diode D1, and the discharging device 140 includes a field effect transistor FET2 and a parasitic diode D2. The connection direction between the source and drain of the field effect transistor FET1 is set in the opposite direction of the field effect transistor FET2. Based on this configuration, the field effect transistor FET1 of the charging device 130 controls current flow from the external port 120 to the battery cells 110, and the field effect transistor FET2 of the discharging device 140 controls current flow from the battery cells 110 to the external port 120. Further, the parasitic diode D1 of the charging device 130 and the parasitic diode D2 of the discharging device 140 are formed so that current flows in the direction opposite to a current direction that is respectively controlled by the field effect transistors FET1 and FET2.

Herein, although the charging device 130 and the discharging device 140 are described above as including the field effect transistors FET1 and FET2, respectively, the technical scope of embodiments of the present invention is not limited thereto and other kinds of switching devices may be used.

The AFE IC 150 electrically connects (or couples) the battery cells 110, the charging device 130, the discharging device 140 and the controller 160. The AFE IC 150 detects the voltage, temperature, and/or charge capacity of the battery cells 110, transfers the detected voltage, temperature, and/or charge capacity to the controller 160, and controls the operation of the charging device 130 and the operation of the discharging device 140 according to the control of the controller 160.

For example, when the battery pack 100 is connected (or coupled) to the external system 200 that includes an external power supply source, the AFE IC 150 sets the field effect transistor FET1 of the charging device 130 to a turn-on state, and sets the field effect transistor FET2 of the discharging device 140 to a turn-off state, thereby enabling the battery cells 110 to be charged. To the contrary, when the battery pack 100 is connected (or coupled) to an external system 200 that includes an external load, the AFE IC 150 sets the field effect transistor FET1 of the charging device 130 to a turn-off state, and sets the field effect transistor FET2 of the discharging device 140 to a turn-on state, thereby enabling the battery cells 110 to be discharged.

The controller 160 includes an IC that is electrically connected (or coupled) between the AFE IC 150 and the external system 200. The controller 160 compares the voltage or charge capacity of the battery cells 110 received through the AFE IC 150 with a full charge voltage value or full charge capacity value that is internally set, and outputs a control signal based on the comparison result to the AFE IC 150, thereby turning on/off the charging device 130 and the discharging device 140.

For example, when the voltage value of the battery cells 110 that is received by the controller 160 exceeds a full charge voltage value that is internally set, for example, about 4.2 V, the controller 160 determines that the battery cells 110 are in a full charge state and outputs the control signal corresponding to the full charge state to the AFE IC 150, thereby turning off the field effect transistor FET1 of the charging device 130. Therefore, charging of the battery cells 110 from the external system 200 is interrupted. At this point, the parasitic diode D1 of the charging device 130 enables the battery pack 100 to be discharged although the field effect transistor FET1 of the charging device 130 is turned off. To the contrary, when the voltage value of the battery cells 110 that is received by the controller 160 is less than a full discharge voltage value that is internally set, for example, about 2.3 V, the controller 160 determines that the battery cells 110 are in a full discharge state and outputs a control signal corresponding to the full discharge state to the AFE IC 150, thereby turning off the field effect transistor FET2 of the discharging device 140. Then, discharging of the battery cells 110 to the external system 200 is interrupted. At this point, the parasitic diode D2 of the discharging device 140 enables the battery pack 100 to be charged although the field effect transistor FET2 of the discharging device 140 is turned off.

Further, the controller 160 communicates with the external system 200 through the SMBUS 180. That is, the controller 160 receives information, such as the voltage of the battery cells 110, through the AFE IC 150 and transfers the received information to the external system 200. At this point, the information from the battery cells 110 may be transferred to the external system 200 through the SMBUS 180 in synchronization with a clock signal CLK.

The storage 170 is electrically connected (or coupled) to the controller 160. The storage 170 may store base information necessary for the operation of the controller 160, for example, a full charge voltage value and a full discharge voltage value. Moreover, the storage 170 may store information that is received from the external system 200 by the controller 160. The storage 170 may store information that is received from the AFE IC 150 by the controller 160.

Hereinafter, a charging control method for a battery pack according to an embodiment of the present invention will be described in more detail.

Figure 2:
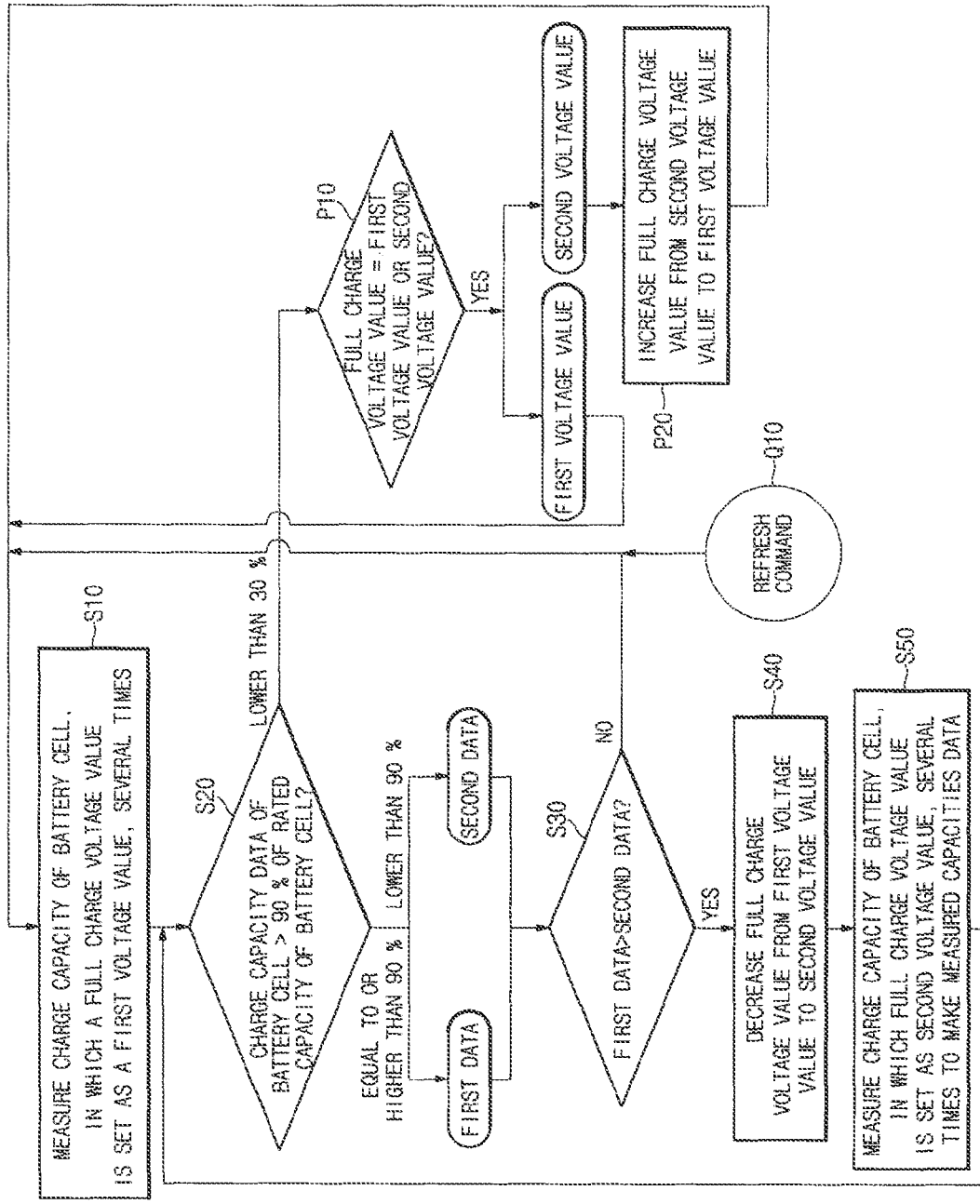
FIG. 2 is a flow chart illustrating a charging control method for a battery pack according to an embodiment of the present invention.

FIG. 2 is a flow chart illustrating a charging control method for a battery pack according to an embodiment of the present invention.

Referring to FIG. 2, in a battery pack including a plurality of battery cells in which a full charge voltage value is set as a first voltage value, a charging control method for a battery pack according to an embodiment of the present invention may include: operation 510 of measuring the charge capacity of a battery cell several times for a certain duration after an initial charge mode; operation 520 of storing the number of measurement times in which the measured charge capacity is equal to or higher than 90% of the rated capacity of the battery cell as first data, and storing the number of measurement times in which the measured charge capacity is less than 90% of the rated capacity of a battery cell as second data; operation 530 of comparing the first data and the second data; and operation S40 of decreasing the full charge voltage value from the first voltage value to a second voltage value and maintaining the decreased voltage value when the first data is greater than the second data and each of the full charge voltage values of the plurality of battery cells is the first voltage value. Further, the charging control method for a battery pack may include operation S50 of measuring the charge capacity of a battery cell, in which the full charge voltage value is reset as the second voltage value, several times.

The charging control method for a battery pack measures the charge capacity of a battery cell in order to decrease the full charge voltage value to the second voltage value in a subsequent charge mode after the initial charge mode in which the full charge voltage value is set as the first voltage value. Herein, the initial charge mode denotes a case in which the battery pack is first charged after being mounted on an external system.

The charging control method for a battery pack can more effectively be applied when the external system 200 on which the battery pack 100 is mounted is being used in an AC mode. Herein, the AC mode denotes a case in which the external system 200 is electrically connected (or coupled) to an AC power supply source and is used. In the AC mode, the external system 200 is connected to the AC power supply source to receive a self-use power, and the battery pack 100 is charged with a power that is provided through the external system 200.

In operation S10, the controller 160 measures the charge capacity of any one of the battery cells 110 several times. In the battery cells 110, each full charge voltage value is set as the first voltage value. The full charge voltage value refers to the voltage value of the battery cell 110 when any one of the battery cells 110 is maximally charged. Accordingly, a difference between the full charge voltage values of the battery cells 110 may occur according to the states of the battery cells 110. The controller 160 selects the battery cell 110 having a relatively high full charge voltage value (e.g., the battery cell 110 having the highest full charge voltage value) and measures the charge capacity of the selected battery cell 110. The full charge voltage value may be set as about 4.10 V to about 4.2 V, but it may be changed according to the specification of the battery cell 110 and is not limited thereto. Hereinafter, a case in which the first voltage value of the full charge voltage value of the battery cell 110 is about 4.17 V will be described as an example.

The controller 160 measures the charge capacity of any one of the battery cells 110 several times for a duration (e.g., a certain duration) through the AFE IC 150, determines the measured values data, and stores the data in the storage 170. To provide a more detailed description, in a state where the battery pack 100 is connected (or coupled) to the external system 200 in order to be charged, the controller 160 measures the charge capacity of any one of the battery cells 110 at certain intervals for a certain duration. For example, the controller 160 measures the charge capacity of the battery cell 110 at intervals of 30 minutes for two weeks. At this point, the measured charge capacity may be recorded as the Relative State Of Charge (RSOC). The RSOC is a value that is obtained by dividing the measured charge capacity of the battery cell 110 by the rated capacity of the battery cell 110 (for example, capacity that is set as the maximum capacity when designing a battery, i.e., a full charge capacity). For example, in a case where the rated capacity (for example, a full charge capacity) of the battery cell 110 is about 1000 mAH, the RSOC becomes about 80% when the measured charge capacity of the battery cell 110 is about 800 mAH.

The following description will be made regarding operation S20. Operation S20 is one that stores the number of measurement times in which the measured charge capacity is equal to or higher than 90% of the rated capacity of the battery cell as first data, and stores the number of measurement times in which the measured charge capacity is less than 90% of the rated capacity of a battery cell as second data. First, the controller 160 determines a case in which the RSOC that is measured is equal to or higher than about 90% and a case in which the RSOC is lower than about 90%. The controller 160 stores the number of measurement times in which the RSOC is equal to or higher than about 90% as the first data, and stores the number of measurement times in which the RSOC is lower than about 90% as the second data. The first and second data may be counted at one time after all charge capacities are measured for a duration (e.g., a certain duration) and stored, but they may be counted each time a charge capacity is measured and sequentially stored. Accordingly, in the case of the first and second data, the total number of times counted is stored as a numerical value.

The RSOC that is equal to or higher than about 90% may mean that the battery cell 110 is in or close to a full charge state. A case in which the RSOC is equal to or higher than about 90% may be a case in which the battery pack 100 is connected (or coupled) to the external system 200 (which is a system for charging a battery pack), and thus, the battery pack 100 is in a charge mode (i.e., the AC mode). The RSOC that is equal to or higher than about 90% may alternatively mean that a charge-completed battery pack 100 is connected (or coupled) to the external system 200 (which is a system using the power of a battery pack), and thereby started discharging, but the RSOC has not yet decreased to less than about 90%.

Next, operations S30 and S40 will be described below. Operation S30 is one that compares the first data and the second data. Further, operation S40 is one that decreases the full charge voltage value of a battery cell from the first voltage value to a second voltage value, and maintains the decreased voltage value when the first data is greater than the second data. The controller 160 compares the first data and the second data to determine whether the numerical value of the first data is greater than that of the second data. When the first data is greater than the second data, the controller 160 may decrease the full charge voltage value of the battery cells 110 from the first voltage value to the second voltage value to reset it. At this point, the full charge voltage value may be based on (e.g., is set to) the highest full charge voltage value among the full charge voltage values of the battery cells 110. Accordingly, the battery pack 100 may more efficiently prevent (or reduce) the deterioration of the battery cells 110 that are relatively easily deteriorated due to having a high full charge voltage value.

When the first voltage value of the full charge voltage value is set as about 4.10 V to about 4.20 V, the second voltage value may be set as a voltage value that is lower than the first voltage value by about 0.10 V to about 0.20 V. Accordingly, the second voltage value may be set as about 4.00V to about 4.10 V. When the second voltage value is lower than about 4.0 V, the output voltage of the battery cell 110 decreases and thereby an external electronic device may not smoothly receive power. When the second voltage value is higher than about 4.1 V, it may be difficult to decrease a degree of (or limit) deterioration of the battery cell 110.

Herein, the first data that is greater than the second data denotes that there are many cases in which the battery pack 100 is connected (or coupled) to the external system 200. Generally, when a battery pack is continuously fully charged in a charge mode, it deteriorates with time, and thus the life of the battery pack may be shortened. Further, a plurality of battery cells may have different degrees of deterioration. Therefore, in the battery pack, if only one of the battery cells becomes over-charged or over-discharged, the entire battery pack 100 may become unstable.

Accordingly, a charging control method for the battery cell 100 according to an embodiment of the present invention may decrease the full charge voltage values of the battery cells 110, and thereby decrease the charge voltage and output voltage of the battery pack 100 when the first data is greater than the second data. The charge control method decreases the full charge voltage value of the battery cell 110 when a value of the first data divided by the second data is greater than 3. A value of the first data divided by the second data being greater than 3 denotes that the battery pack 110 was in a charge mode three times more often than the battery pack 110 was not in the charge mode, and thus, the battery cells 110 may have often been left in a condition capable of increasing deterioration. The battery cells 110 are relatively more quickly deteriorated in a high charge voltage state than a low charge voltage state. Accordingly, as the full charge voltage value of the battery cells 110 decreases, a degree of deterioration decreases and the life of the battery cells 110 are not shortened (or are shortened less).

A case in which the first data is less than the second data, and more preferably, a case in which a value of the first data divided by the second data is less than 3, denotes that there are relatively few cases in which the battery pack 100 is in the charge mode. Accordingly, the controller 160 again performs operation S10 while maintaining the full charge voltage value of the battery cells 110 as the first voltage value. More specifically, the controller 160 maintains the full charge voltage value as the first voltage value when the full charge voltage value is set as the first voltage value. The controller 160 increases the full charge voltage value to the first voltage value and resets the full charge voltage value when the full charge voltage value is set as the second voltage value. At this point, the controller 160 initializes pre-measured data that are stored in the storage 170 to delete all of the data in the storage 170.

The following description will be made regarding operation S50. Operation S50 is one that measures the charge capacity of a battery cell several times after the full charge voltage value of the battery cell is reset as the second voltage value. The controller 160 resets the full charge voltage value of the battery cells 110 as the second voltage value, and measures the charge capacity of the battery cell 110 several times.

Since the full charge voltage value of the battery cells 110 is reset as the second voltage value, a rated capacity (which is a full charge capacity that is set by the controller 160 to be suitable for the second voltage value) that is used as the base of RSOC is also reset to be suitable for the second voltage value. Accordingly, the controller 160 again performs operation S50 while maintaining the full charge voltage value of the battery cells 110 as the second voltage value. At this point, the controller 160 initializes the storage 170 to delete all pre-measured data that are stored in the storage 170.

Further, the controller 160 again performs operations S20, S30 and S40 sequentially.

When the RSOC of the battery cell 110 is measured as being equal to or lower than about 30% in operations S10 and S20, the charging control method may further include operations P10 and P20 to increase the full charge voltage value of the battery cells 110. When the RSOC is equal to or lower than about 30%, the charge capacity of the battery cells 110 may be low. Accordingly, the controller 160 increases the full charge voltage value to the first voltage value to reset it. More specifically, when the RSOC is equal to or lower than about 30%, the controller 160 determines whether the current full charge voltage value of the battery cells 10 is the first voltage value or the second voltage value. Further, when the full charge voltage value is set as the first voltage value, the controller 160 maintains the full charge voltage value as the first voltage value. When the full charge voltage value is set as the second voltage value, the controller 160 increases the full charge voltage value to the first voltage value to reset it.

Further, when the full charge voltage value of the battery cells 110 is the first voltage value, the controller 160 again performs operation S10 while maintaining the full charge voltage value as the first voltage value. When the full charge voltage value of the battery cells 110 is the second voltage value, the controller 160 increases the full charge voltage value from the second voltage value to the first voltage value to reset it, and again performs operation S10.

The charging control method may further include operation Q10 of refreshing the battery pack 100 through the external system 200. The controller 160 may receive a refresh command from the external system 200 through the SMBUS 180. The controller 160 determines whether a current-set full charge voltage value is the first voltage value or the second voltage value when receiving a refresh signal. When the full charge voltage value of the battery cells 110 is the first voltage value, the controller 160 performs operation S10 while maintaining the full charge voltage value as the first-voltage value. When the full charge voltage value of the battery cells 110 is the second voltage value, the controller 160 increases the full charge voltage value of the battery cells 110 from the second voltage value to the first voltage value to reset it, and performs operation S10. At this point, the controller 160 initializes the storage 170 to delete all pre-measured data that are stored in the storage 170.

A charging control method for battery pack according to another embodiment will be described below in detail.

Figure 3:
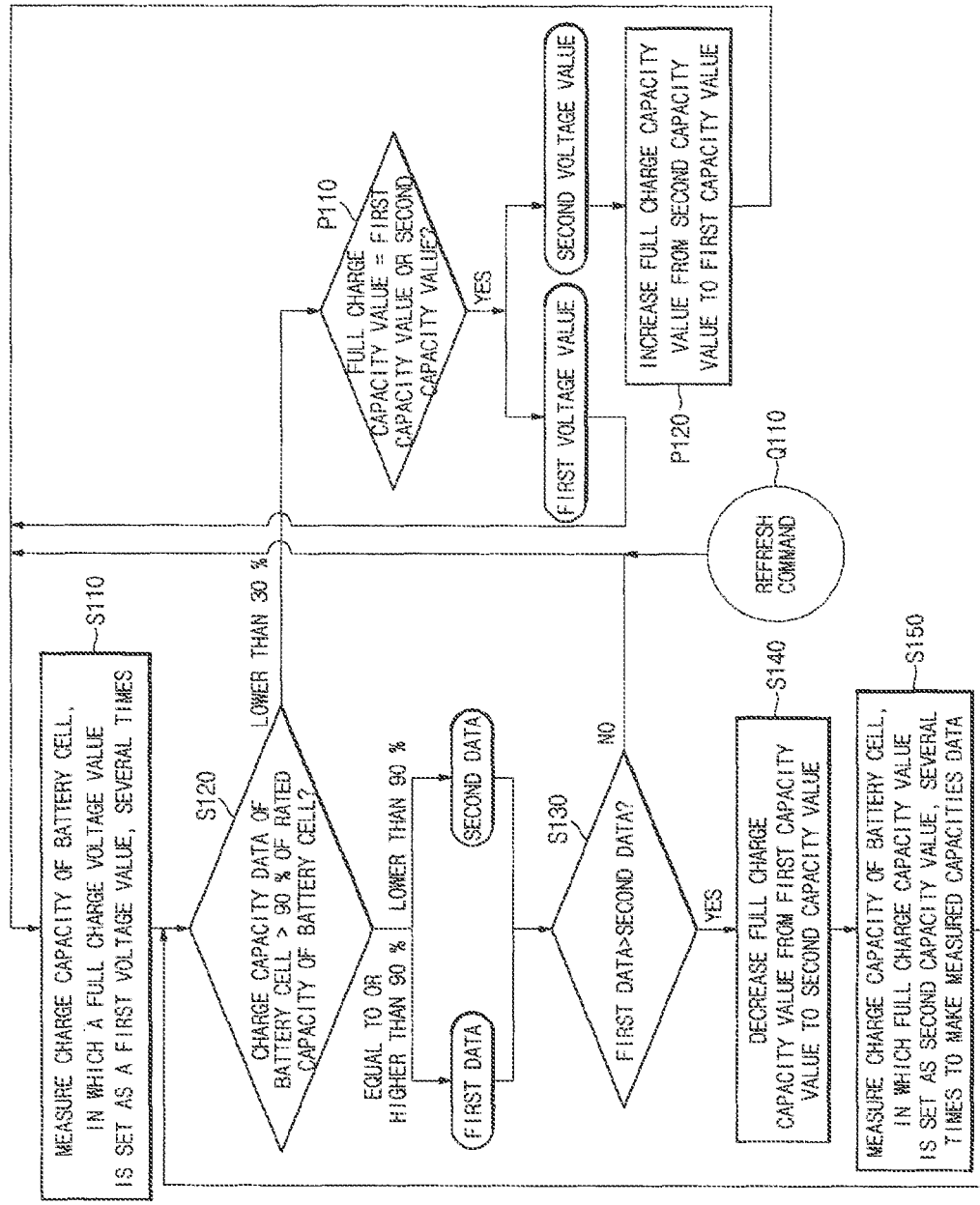
FIG. 3 is a flow chart illustrating a charging control method for a battery pack according to another embodiment of the present invention.

FIG. 3 is a flow chart illustrating a charging control method for a battery pack according to another embodiment of the present invention.

Comparing a charging control method for a battery pack according to another embodiment with the charging control method according to the embodiment of FIG. 2, the two charging control methods have the same (or similar) operations, except for resetting a full charge capacity value instead of a full charge voltage value according to the first and second data.

Referring to FIG. 3, in a battery pack including a plurality of battery cells in which a full charge capacity value is set as a first capacity value, a charging control method for battery pack according to another embodiment of the present invention may include: operation S110 of measuring the charge capacity of a battery cell several times for a duration (e.g., a certain duration) after an initial charge mode; operation S120 of storing the number of measurement times in which the measured charge capacity is equal to or higher than 90% of the rated capacity of the battery cell as first data, and storing the number of measurement times in which the measured charge capacity is less than 90% of the rated capacity of a battery cell as second data; operation S130 of comparing the first data and the second data; and operation S140 of decreasing the full charge capacity value from the first capacity value to a second capacity value and maintaining the decreased capacity value when the full charge capacity value is the first capacity value in a case where the first data is greater than the second data. Further, the charging control method for a battery pack may further include operation S150 of measuring the charge capacity of a battery cell, in which the full charge capacity value is reset as the second capacity value, several times.

The charging control method for a battery pack measures the charge capacity of a battery cell in order to decrease the full charge capacity value to the second capacity value in a subsequent charge mode after the initial charge mode in which the full charge capacity value is set as the first capacity value.

In operation S110, the controller 160 measures the charge capacity of any one of the battery cells 110 several times. In the battery cells 110, each full charge capacity value is set as the first capacity value. The full charge capacity value refers to the maximum charge capacity (or maximum discharge capacity) of the battery cells 110 when any one of the battery cells 110 is maximally charged. Accordingly, a difference between the full charge capacity values of the battery cells 110 may occur according to the states of the battery cells 110. The controller 160 selects the battery cell 110 having a relatively high full charge capacity value and measures the charge capacity of the selected battery cell 110. Hereinafter, a case in which the first capacity value of the full charge capacity value of the battery cell 110 is about 2600 mAh will be described as an example.

The controller 160 measures the charge capacity of any one of the battery cells 110 several times for a duration (e.g., a certain duration) through the AFE IC 150, and stores the measured values in the storage 170. To provide a more detailed description, in a state where the battery pack 100 is connected (or coupled) to the external system 200 in order to be charged, the controller 160 measures the charge capacity of any one of the battery cells 110 at certain intervals for a certain duration. For example, the controller 160 measures the charge capacity of the battery cell 110 at intervals of 30 minutes for two weeks. At this point, the measured charge capacity may be recorded as the RSOC. The RSOC is a value that is obtained by dividing the charge capacity (which is a charge capacity when measuring) of the battery cell 110 by the rated capacity of the battery cell 110 (for example, capacity that is set as the maximum capacity when designing a battery, i.e., a full charge capacity).

Operation S120 is one that stores the number of measurement times in which the measured charge capacity is equal to or higher than 90% of the rated capacity of the battery cell as first data, and stores the number of measurement times in which the measured charge capacity is less than 90% of the rated capacity of a battery cell as second data. The controller 160 determines cases in which the measured RSOC that is measured is equal to or higher than about 90% and cases in which the RSOC is lower than about 90%. The controller 160 stores the number of measurement times in which the RSOC is equal to or higher than about 90% as the first data, and stores the number of measurement times in which the RSOC is lower than about 90% as the second data. The first and second data may be counted at one time after the RSOC is measured for two weeks and stored, but they may be counted each time the RSOC is measured and sequentially stored. Accordingly, in the case of the first and second data, the total number of times counted is stored as a numerical value.

The RSOC that is equal to or higher than about 90% may mean that the battery cell 110 is in or close to a full charge state. A case in which the RSOC is equal to or higher than about 90% may be a case in which the battery pack 100 is connected (or coupled) to the external system 200 (which is a system for charging a battery pack), and thus, the battery pack 100 is in a charge mode (i.e., the AC mode). The RSOC that is equal to or higher than about 90% may alternatively mean that a charge-completed battery pack 100 may be connected (or coupled) to the external system 200 (which is a system using the power of a battery pack), and thus started discharging, but the RSOC has not yet decreased to less than about 90%.

Next, operations S130 and S140 will be described below. Operation S130 is one that compares the first data and the second data. Further, operation S140 is one that decreases the full charge capacity value of the battery cells from the first capacity value to a second capacity value, and maintains the decreased capacity value when the first data is greater than the second data.

The controller 160 compares the first data and the second data to determine whether the numerical value of the first data is greater than that of the second data. When the first data is greater than the second data, the controller 160 may decrease the full charge capacity value of the battery cells 110 from the first capacity value to the second capacity value to reset it. At this point, the full charge capacity value may be based on (e.g., is set to) the highest full charge capacity value among the full charge capacity values of the battery cells 110. Accordingly, the battery pack 100 may more efficiently prevent (or reduce) the deterioration of the battery cells 110 that are relatively easily deteriorated due to having a high full charge capacity value.

The second capacity value may be set as a capacity value which is about 80% to about 90% of the first capacity value. When the second capacity value is lower than 80% of the first capacity value, the charge capacity and output voltage of the battery cells 110 decrease, and thus, the external system 200 may not smoothly receive power. When the second capacity value is higher than 90% of the first capacity value, it may be difficult to decrease the degree of deterioration of the battery cells 110.

The first data that is greater than the second data denotes that there are many cases in which the battery pack 100 is connected (or coupled) to the external system 200 and is in a charge mode (i.e., an AC mode). Further, a value of the first data divided by the second data being greater than 3 denotes that the battery pack 110 was in a charge mode three times more often than the battery pack 110 was not in the charge mode, and thus, the battery cells 110 may have often been left in a condition capable of increasing deterioration. Accordingly, in a case where the first data is greater than the second data, and more preferably, when a value of the first data divided by the second data is more than 3, by decreasing the full charge capacity values of the battery cells 110, the degree of deterioration of the battery pack 100 may be reduced.

Further, a case in which the first data is less than the second data, and more preferably, a case in which a value of the first data divided by the second data is less than 3, denotes that there are relatively few cases in which the battery pack 100 is in the charge mode. Accordingly, the controller 160 again performs operation S10 while maintaining the full charge capacity value of the battery cells 110 as the first capacity value. That is, the controller 160 maintains the full charge capacity value as the first capacity value when the full charge capacity value is set as the first capacity value. The controller 160 increases the full charge capacity value to the first capacity value and resets the full charge capacity value when the full charge capacity value is set as the second capacity value. At this point, the controller 160 initializes pre-measured data that are stored in the storage 170 to delete all the data of the storage 170.

Operation S150 is one that measures the charge capacity of a battery cell several times after the full charge capacity value of the battery cell is reset as the second capacity value. The controller 160 resets the full charge capacity value of the battery cells 110 as the second capacity value, and measures the charge capacity of the battery cell 110, which is set as the second capacity value, several times to store the measured capacities. In this case, since the full charge capacity value of the battery cells 110 is reset as the second capacity value, a rated capacity (which is a full charge capacity that is set by the controller 160 to be suitable for the second capacity value) that is used as the base of RSOC is also reset to be suitable for the second capacity value. Herein, the full charge capacity value and the rated capacity may be set to have the same value.

When the RSOC of the battery cell 110 is measured as being equal to or lower than about 30% in operations S110 and S120, the charging control method may further include operations P110 and P120 to increase the full charge capacity value of the battery cells 110. When the RSOC is equal to or lower than about 30%, the charge capacity of the battery cell 110 may be low. Accordingly, the controller 160 increases the full charge capacity value to the first capacity value to reset it. More specifically, when the RSOC is equal to or lower than about 30%, the controller 160 determines whether the current full charge capacity value of the battery cells 110 is the first capacity value or the second capacity value. Further, when the full charge capacity value is set as the first capacity value, the controller 160 maintains the full charge capacity value as the first capacity value. When the full charge capacity value is set as the second capacity value, the controller 160 increases the full charge capacity value to the first capacity value to reset it.

Further, when the full charge capacity value of the battery cells 110 is the first capacity value, the controller 160 again performs operation S10 while maintaining the full charge capacity value as the first capacity value. When the full charge capacity value of the battery cells 110 is the second capacity value, the controller 160 increases the full charge capacity value from the second capacity value to the first capacity value to reset it, and again performs operation S110.

The charging control method may further include operation Q110 of refreshing the battery pack 100 through the external system 200. The controller 160 may receive a refresh command from the external system 200 through the SMBUS 180. The controller 160 determines whether a current-set full charge capacity value is the first capacity value or the second capacity value when receiving a refresh signal. When the full charge capacity value of the battery cells 110 is the first capacity value, the controller 160 performs operation S10 while maintaining the full charge capacity value as the first capacity value. When the full charge capacity value of the battery cells 110 is the second capacity value, the controller 160 increases the full charge capacity value of the battery cells 110 from the second capacity value to the first capacity value to reset it, and performs operation S10. At this point, the controller 160 initializes the storage 170 to delete all pre-measured data that are stored in the storage 170.

A charging control method for a battery pack according to another embodiment of the present invention will be described below in detail.

Figure 4:
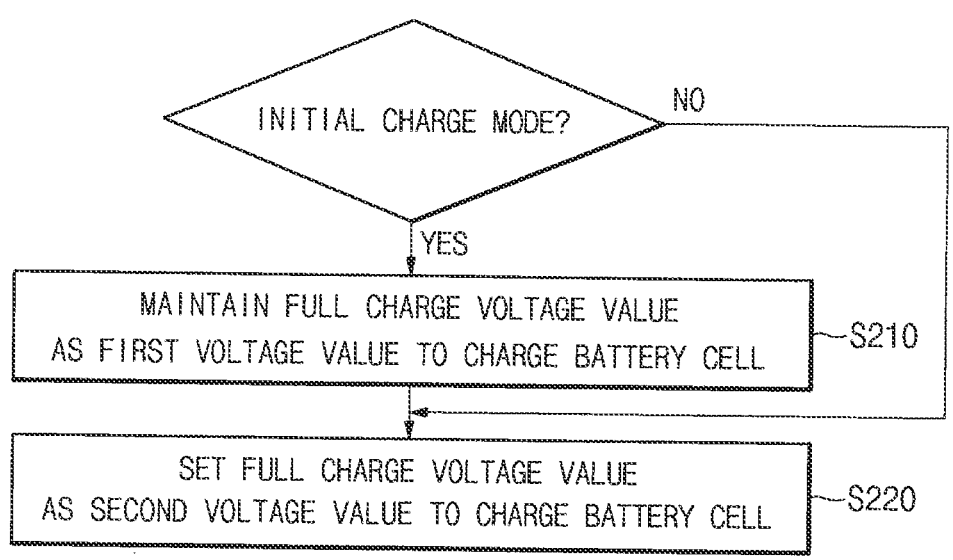
FIG. 4 is a flow chart illustrating a charging control method for a battery pack according to another embodiment of the present invention.

FIG. 4 is a flow chart illustrating a charging control method for a battery pack according to another embodiment of the present invention.

A charging control method for a battery pack according to another embodiment may include: operation S210 of charging the plurality of battery cells 110, in which a full charge voltage value is set as a first voltage value, from an initial charge mode to the first voltage value; and operation S220 of resetting the full charge voltage values of the battery cells 110 as a second voltage value less than the first voltage value to charge the battery cells 110 in a charge mode after the initial charge mode.

In the battery cells 110, each full charge voltage value is set as the first voltage value. The full charge voltage value means the voltage value of the battery cells 110 when any one of the battery cells 110 is maximally charged. Generally, the full charge voltage value of the battery cells 110 is set as about 4.17 V, but it may be changed according to the specification of the battery cells 110 and is not limited thereto. Hereinafter, a case in which the first voltage value of the full charge voltage value of the battery cells 110 is about 4.17 V will be described as an example.

The battery pack 100 is mounted on the external system 200, and may be charged until the full charge voltage value becomes the first voltage value in the initial charge mode. That is, the battery pack 100 may be charged until the full charge voltage value becomes about 4.17 V. At this point, the external system 200 is used in the AC mode.

The controller 160 resets the full charge voltage value of the battery cells 110 as a second voltage value less than the first voltage value in a charge mode after the initial charge mode, and more preferably, from the second charge mode. When the battery pack 100 is mounted on the external system 200, it does not supply a power to the external system 200, and thus discharging is only performed through natural discharging. Accordingly, since the battery pack 100 has a relatively low power that is discharged, it may be charged with a relatively low full charge voltage value from the second charge mode.

Accordingly, the controller 160 decreases the full charge voltage value of the battery cells 110, and thus charges the battery cells 110 in a charge mode after the initial charge mode. Therefore, by decreasing the output voltage of the battery pack 100, a degree of deterioration of the battery pack 100 may be reduced.

When the battery pack 100 is continuously fully charged in the charge mode, the battery cells 110 deteriorate with time, and thus the life of the battery cells 110 may be shortened. Moreover, the battery cells 110 may have different degrees of deterioration and consequently, the battery pack 100 may become unstable.

In the charging control method for a battery pack, when the first voltage value of the full charge voltage value is set as about 4.10 V to about 4.20 V, the second voltage value may be set as a voltage value lower than the first voltage value by about 0.10 V to about 0.20 V. Accordingly, the second voltage value may be set as about 4.00V to about 4.10 V. When the second voltage value is lower than about 4.0 V, the output voltage of the battery cells 110 decreases and thereby an external electronic device may not smoothly receive a power. When the second voltage value is higher than about 4.1 V, it may be difficult to decrease a degree of deterioration of the battery cells 110.

A charging control method for a battery pack according to another embodiment of the present invention will be described below in detail.

Figure 5:
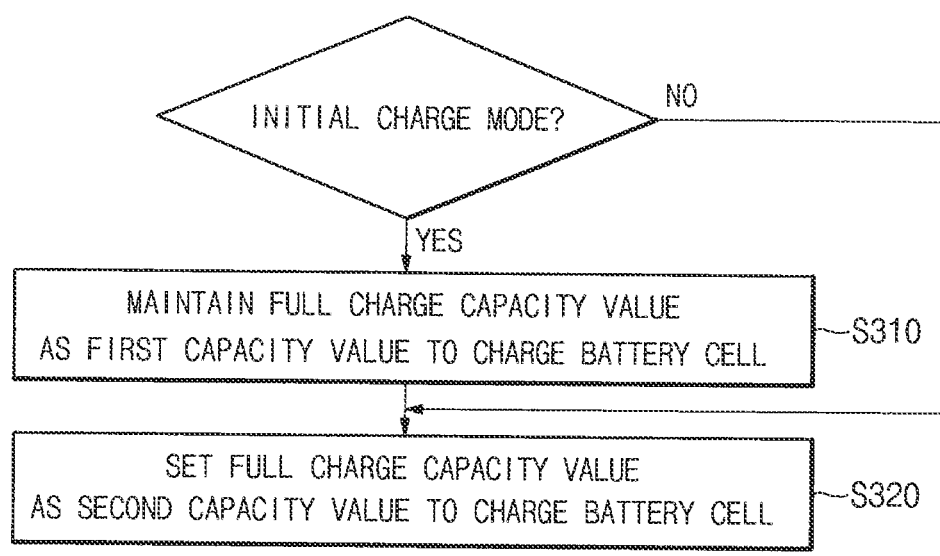
FIG. 5 is a flow chart illustrating a charging control method for a battery pack according to another embodiment of the present invention.

FIG. 5 is a flow chart illustrating a charging control method for a battery pack according to another embodiment of the present invention.

A charging control method for a battery pack according to another embodiment of the present invention may include operation S310 of charging the plurality of battery cells 110, in which a full charge capacity value is set as a first capacity value from an initial charge mode to the first voltage value; and operation S320 of resetting the full charge capacity values of the battery cells 110 as a second capacity value less than the first capacity value to charge the battery cells 110 in a charge mode after the initial charge mode.

Comparing a charging control method for a battery pack according to another embodiment with the charging control method of FIG. 4, the two charging control methods have the same operations, except for resetting a full charge capacity value instead of a full charge voltage value.

In the battery cells 110, each full charge capacity value is set as the first capacity value. The full charge capacity value means the maximum charge capacity (or maximum discharge capacity) of the battery cells 110 when any one of the battery cells 110 is maximally charged. Hereinafter, a case in which the first capacity value of the full charge capacity value of the battery cell 110 is about 2600 mAh will be described as an example.

The battery pack 100 is mounted on the external system 200, and may be charged until the full charge capacity value becomes the first capacity value in the initial charge mode (i.e., the AC mode). That is, the battery pack 100 may be charged until the full charge capacity value becomes about 2600 mAh.

The controller 160 resets the full charge capacity values of the battery cells 110 as a second capacity value less than the first capacity value in a charge mode after the initial charge mode, and more preferably, from the second charge mode. The battery pack 100 is charged with the second capacity value.

The second capacity value may be set as a capacity value which is about 80% to about 90% of the first capacity value. When the second capacity value is lower than 80% of the first capacity value, the output voltage of the battery cells 110 decreases and thereby the external system 200 may not smoothly receive power. When the second capacity value is higher than 90% of the first capacity value, it may be difficult to decrease a degree of deterioration of the battery cells 110.

The battery pack and charging control method thereof according to embodiments of the present invention measure the charge capacity of the battery cells 110 and change the full charge voltage value or the full charge capacity value based on a certain condition, and thus prevents (or reduces) the deterioration of the battery cell, preventing the life of the battery cells 110 from being shortened (or reducing the amount that the life is shortened). Accordingly, the battery pack and the charging control method can increase the stability of the battery cells 110.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A charging control method for a battery pack comprising a plurality of battery cells in which a full charge voltage value is initially set as a first voltage value, the charging control method comprising:
   charging the plurality of battery cells to the first voltage value in an initial charge mode; and
   resetting the full charge voltage value to a second voltage value less than the first voltage value in a subsequent charge mode,
   wherein the resetting the full charge voltage value comprises:
      measuring a charge capacity of any one of the battery cells several times for a duration after the initial charge mode;
      storing a number of measurement times in which the measured charge capacity is equal to or higher than 90% of a rated capacity of the battery cell as first data, and storing a number of measurement times in which the measured charge capacity is less than 90% of the rated capacity of the battery cell as second data;

comparing the first data and the second data; and decreasing the full charge voltage value from the first voltage value to the second voltage value when the first data is greater than the second data.

2. The charging control method as claimed in claim 1, wherein the measuring of the charge capacity is performed when an external system coupled to the battery pack is being used in an Alternating Current (AC) mode.

3. The charging control method as claimed in claim 1, wherein in the decreasing of the full charge voltage values, the full charge voltage value is set as a full charge voltage value of a battery cell having a highest full charge voltage value from among the plurality of battery cells.

4. The charging control method as claimed in claim 1, wherein the decreasing of the full charge voltage value is performed when a value of the first data divided by the second data is greater than 3.

5. The charging control method as claimed in claim 1, wherein when the first voltage value is set as about 4.10 V to about 4.20 V, the second voltage value is set as a voltage value less than the first voltage value by about 0.10 V to about 0.20 V.

6. The charging control method as claimed in claim 1, wherein when the measured charge capacity is lower than 30% of the rated capacity, the charging control method further comprises:

maintaining the full charge voltage value as the first voltage value, when the full charge voltage value is set as the first voltage value; and increasing the full charge voltage value to the first voltage value, when the full charge voltage value is set as the second voltage value.

7. The charging control method as claimed in claim 1, wherein when the first data is less than the second data, the charging control method further comprises:

maintaining the full charge voltage value as the first voltage value, when the full charge voltage value is set as the first voltage value; and increasing the full charge voltage value to the first voltage value, when the full charge voltage value is set as the second voltage value.

8. The charging control method as claimed in claim 1, wherein when the battery pack receives a refresh command from an external system, the charging control method further comprises:

maintaining the full charge voltage value as the first voltage value, when the full charge voltage value is set as the first voltage value; and increasing the full charge voltage value of the battery cells to the first voltage value, when the full charge voltage values of the battery cells are set as the second voltage value.

9. The charging control method as claimed in claim 1, wherein the plurality of battery cells are charged with the second voltage value from the subsequent charge mode.

10. The charging control method as claimed in claim 9, wherein the second voltage value is less than the first voltage value by about 0.10 V to about 0.20 V.

11. A charging control method for a battery pack including a plurality of battery cells in which a full charge capacity value is initially set as a first capacity value, the charging control method comprising:

charging the plurality of battery cells to the first capacity value in an initial charge mode; and resetting the full charge capacity value to a second capacity value less than the first capacity value in a subsequent charge mode, wherein the resetting the full charge capacity value comprises:

measuring a charge capacity of any one of the battery cells several times for a duration after the initial charge mode;

storing a number of measurement times in which the measured charge capacity is equal to or higher than 90% of a rated capacities of the battery cells as first data, and storing a number of measurement times in which the measured charge capacity is less than 90% of the rated capacities of the battery cells as second data;

comparing the first data and the second data; and decreasing the full charge capacity value from the first capacity value to the second capacity value when the first data is greater than the second data.

12. The charging control method as claimed in claim 11, wherein the measuring of the charge capacity is performed when an external system coupled to the battery pack is being used in an Alternating Current (AC) mode.

13. The charging control method as claimed in claim 11, wherein in the decreasing of the full charge capacity values, the full charge capacity value is set as a full charge capacity value of a battery cell having a highest full charge capacity value from among the plurality of battery cells.

14. The charging control method as claimed in claim 11, wherein the decreasing of the full charge capacity value is performed when a value of the first data divided by the second data is greater than 3.

15. The charging control method as claimed in claim 11, wherein when the measured charge capacity is lower than 30% of the rated capacity, the charging control method further comprises:

maintaining the full charge capacity value as the first capacity value, when the full charge capacity value is set as the first capacity value; and increasing the full charge capacity value to the first capacity value, when the full charge capacity value is set as the second capacity value.

16. The charging control method as claimed in claim 11, wherein when the first data is less than the second data, the charging control method further comprises:

maintaining the full charge capacity value as the first capacity value, when the full charge capacity value is set as the first capacity value; and increasing the full charge capacity value to the first capacity value, when the full charge capacity value is set as the second capacity value.

17. The charging control method as claimed in claim 11, wherein when the battery pack receives a refresh command from an external system, the charging control method further comprises:

maintaining the full charge capacity value as the first capacity value, when the full charge capacity value is set as the first capacity value; and increasing the full charge capacity value to the first capacity value, when the full charge capacity value is set as the second capacity value.

18. The charging control method as claimed in claim 11, wherein the plurality of battery cells are charged with the second capacity value from the subsequent charge mode.

* * * * *

UNITED STATES PATENT AND TRADEMARK OFFICE
CERTIFICATE OF CORRECTION

| | |
|---|---|
| PATENT NO. | : 8,618,773 B2 |
| APPLICATION NO. | : 12/881094 |
| DATED | : December 31, 2013 |
| INVENTOR(S) | : Jongwoon Yang et al. |

It is certified that error appears in the above-identified patent and that said Letters Patent is hereby corrected as shown below:

In the Claims:

Col. 16, line 13, Claim 11    Delete "of a rated",
                              Insert --of rated--

Signed and Sealed this
Third Day of February, 2015

Michelle K. Lee
*Deputy Director of the United States Patent and Trademark Office*